June 8, 1937.  J. D. MADARAS  2,082,966
WIND MOTOR
Original Filed Feb. 9, 1931   3 Sheets-Sheet 1
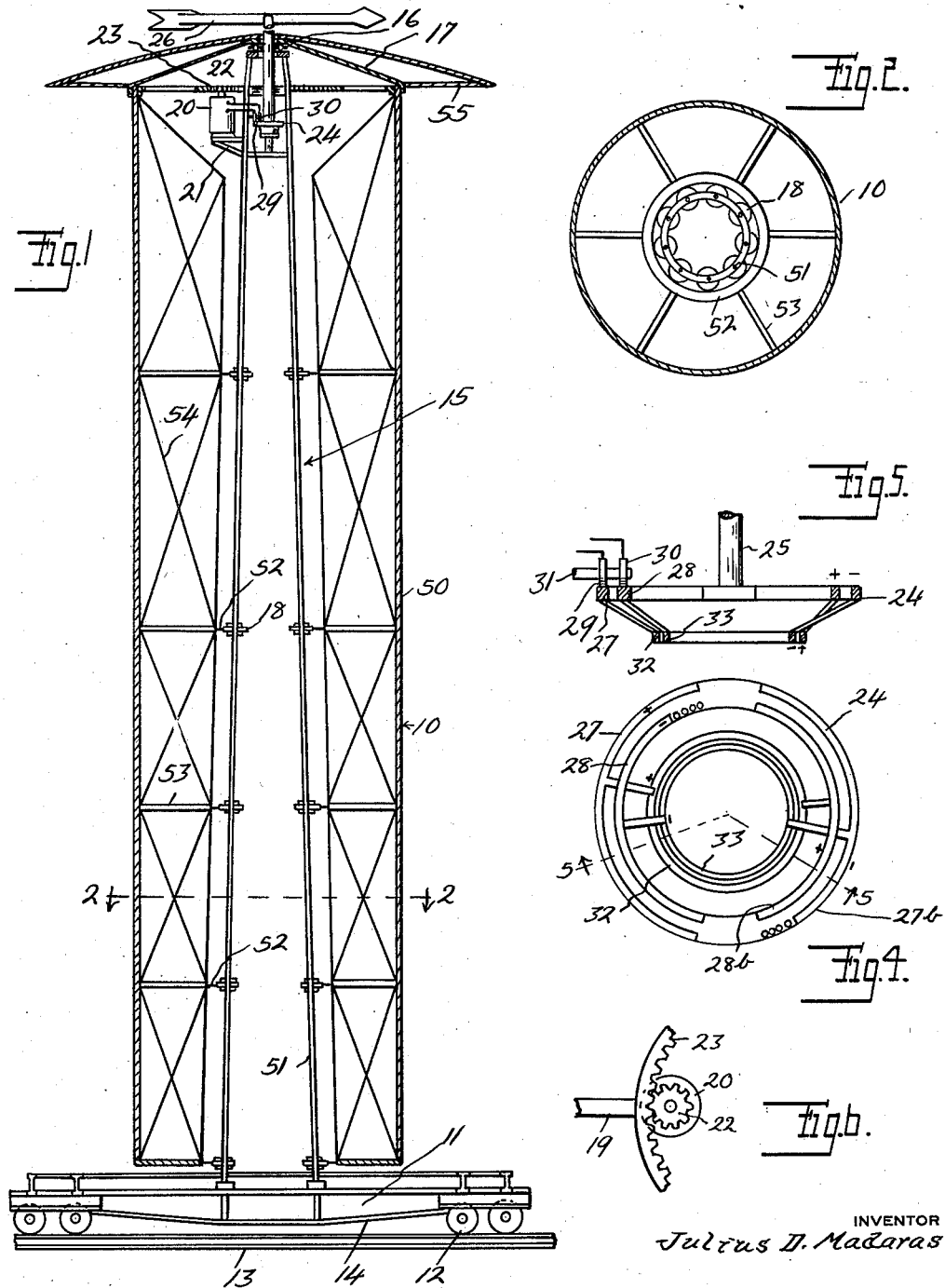

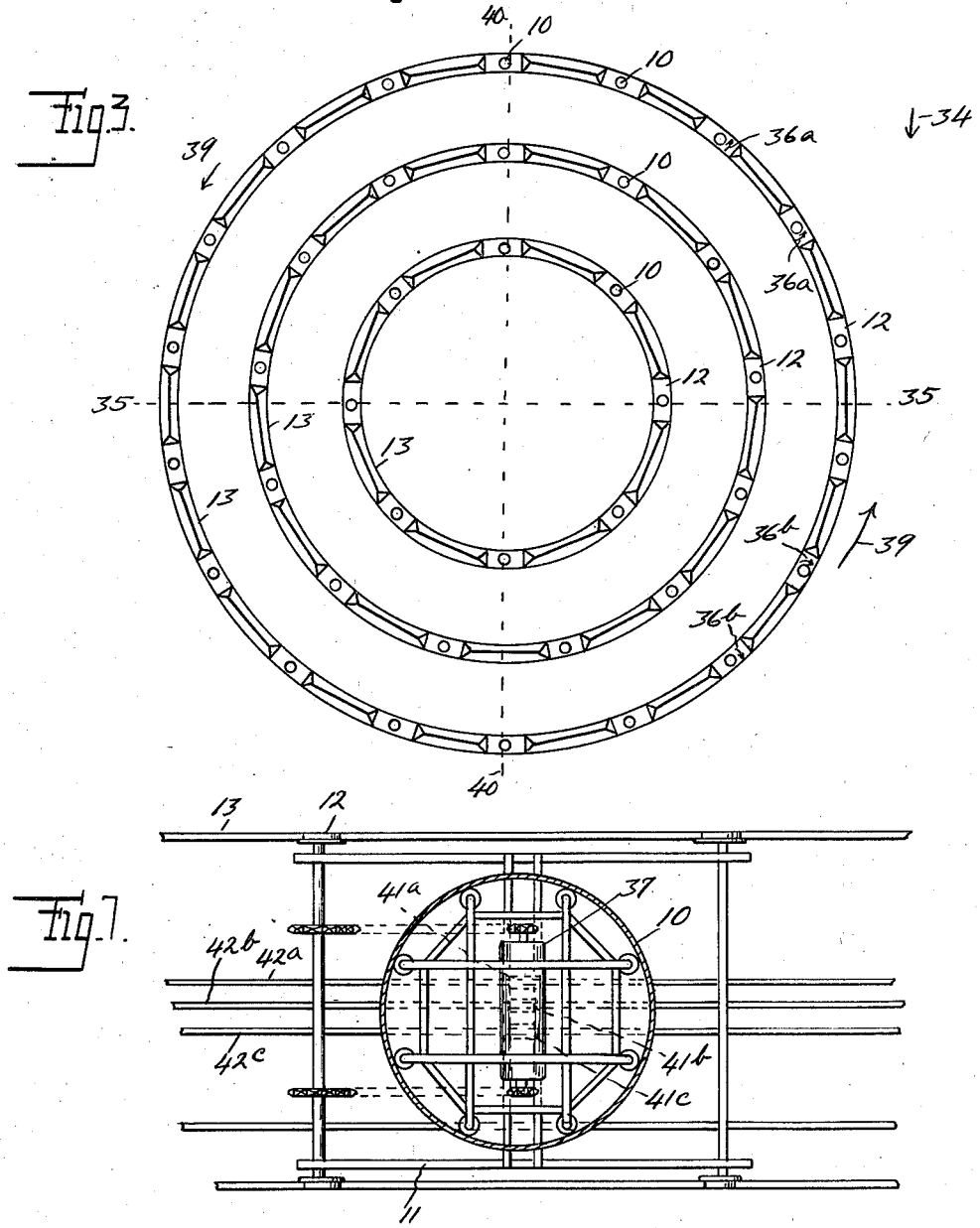

June 8, 1937. J. D. MADARAS 2,082,966
WIND MOTOR
Original Filed Feb. 9, 1931 3 Sheets-Sheet 3
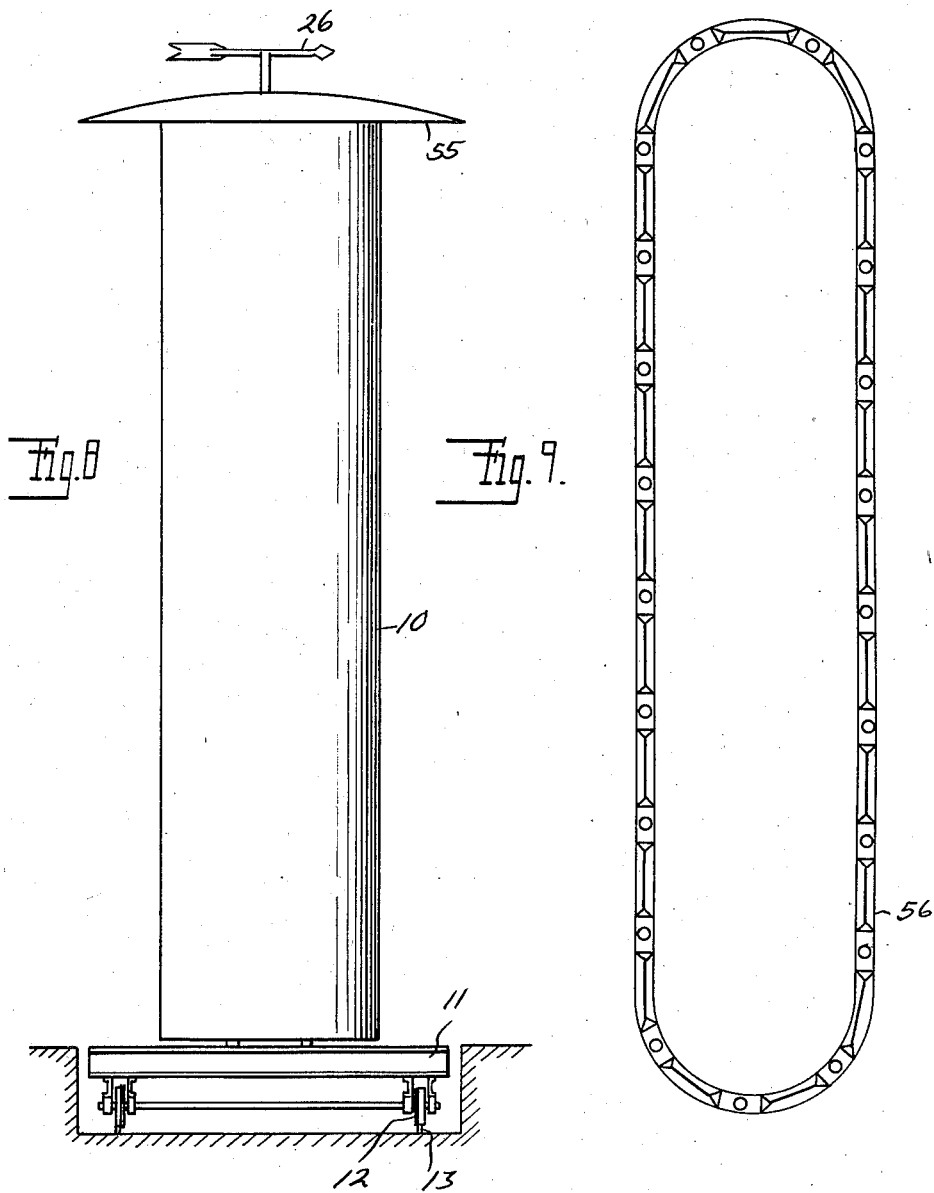
INVENTOR
Julius D. Madaras
BY
Whittemore Hulbert Whittemore
& Belknap ATTORNEYS Patented June 8, 1937

2,082,966

UNITED STATES PATENT OFFICE 2,082,966

WIND MOTOR

Julius D. Madaras, Detroit, Mich., assignor to Madaras Rotor Power Corporation, Detroit, Mich., a corporation of Michigan Application February 9, 1931, Serial No. 514,557
Renewed October 10, 1934

6 Claims. (Cl. 170—11)

The invention relates to wind engines or devices for producing power by the action of the wind or other fluid and is a continuation in part of my co-pending application, now Patent No. 1,791,731.

The principal object of my invention is to provide an apparatus capable of being used for developing power on a large scale from the force of the wind. In attaining this end I have utilized a well known principle, the Magnus effect, but have employed the same in a novel manner.

My invention consists in arranging a plurality of cylinders or other equivalent symmetrical elongated rotors in such a manner that each can rotate about its own axis and also have a bodily movement in a fixed path, which preferably is a circular orbit. The rotors are of a size sufficient to present a large surface area to the wind and are arranged so that the wind strikes against the same in all positions in the orbit. Each cylinder is provided with means for rotating the same about its axis and the force developed by the action of the wind upon the rotating cylinder tends to move the same bodily in its orbital path. The cylinders, however, are not continuously rotated but are caused to be reversed at predetermined intervals during the orbital movement thereof, the arrangement being such that during one-half of the cycle of orbital movement they are rotating in one direction and during the other half they are rotating in the opposite direction. Means is therefore provided for reversing the rotation of each cylinder when it has reached the extreme position in a direction transverse to the direction of the wind. Thus each cylinder is acted upon during approximately one-half of its cycle by a force urging it in one direction transverse to the direction of the wind and during the other half cycle is acted upon by a force urging it in the opposite direction. When the bodily movement of the cylinders is constrained to a circular orbit, they are moved continuously in the circular path by the periodic axial rotation of the same. Since the point in the orbit for reversal of the rotation depends upon the direction of the wind, the reversing mechanism is preferably controlled by a wind vane or other device operated by the wind.

In the drawings

Figure 1 is a sectional elevation of a rotor embodying my invention;

Figure 2 is a section on the line 2—2 of Figure 1;

Figure 3 is a plan view of a rotor power plant;

Figure 4 is a plan view of the mechanism for reversing the motor;

Figure 5 is a transfer section on the line 5—5 of Figure 4;

Figure 6 illustrates the mechanism for rotating the rotors;

Figure 7 is a sectional plan view of a car on which the rotor is mounted; the rotor construction being slightly modified from that illustrated in Figure 2;

Figure 8 is an elevation of a modified rotor and car structure;

Figure 9 is a plan view of a modified rotor power plant.

Referring now to the embodiment of the invention illustrated in the drawings, the apparatus comprises a plurality of rotatable cylinders or other suitable rotors 10, each of which is rotatably mounted upon a suitable base or frame 11. This frame is provided with wheels 12 for mounting the same upon a track 13, which track extends in an endless circuit about a central point and is preferably circular. The wheeled frames 11 are connected together by suitable means such as the cables 14 so that all of the frames move together on the track 13.

For mounting each of the cylinders 10 each frame is provided with a suitable tower 15 carrying at its upper end a bearing 16 for supporting the weight of the cylinder 10. The cylinder has an upper end portion 17 supported on the bearing 16 and the cylindrical side portions surrounding the tower. For guiding the cylinder in its rotative movements there are provided a series of roller guides 18 supported on the tower 15.

The rotor 10 as shown in Figure 1 has an outer shell 50 spaced radially outward for a substantial distance beyond the stationary tower 15. Thus as shown, the tower consists of a plurality of vertically extending rods 51 anchored in the frame 11 arranged in a circle of much smaller diameter than the diameter of the shell 50. The roller guides 18 are spaced at intervals along each of the rods 51. For cooperating with the roller guides 18 there are a plurality of circular tracks 52 carried at vertically spaced points within the outer shell 50 by radially extending arms 53 which in turn are reinforced by cross-bracing truss structure 54. At the top of the rotor is a laterally projecting flange or plate 55 which increases the effective power developed in the rotor by the Magnus effect.

It has been found by experiment that the rotor construction as above described and illustrated in Figures 1 and 2 is more efficient dynamically than the construction described in my prior Patent No. 1,791,731 and also illustrated in Figure 7 of this application. It has been found that there is much less resistance to rotation of the shell 50 when the roller guides 18 are spaced inwardly a substantial distance as indicated in Figure 2 instead of directly engaging the shell as in Figure 7. This is due to the fact that the cross-bracing truss structure 54 when caused to revolve with the outer shell rotates with the whirling air inside of the rotor and does not introduce the same amount of frictional resistance as the structure illustrated in Figure 7. The truss structure of Figure 7 is stationary and introduces more resistance to the rotation of the shell. The construction illustrated in Figures 1 and 2 is an important feature of my invention.

Any suitable means may be used for rotating the cylinder 10 but in the preferred embodiment of the invention each cylinder is provided with an independent electric motor 20 of a reversible type mounted upon a frame 21 on the tower and carrying a pinion 22, meshing with an internal gear 23 at the upper end of the rotor. 24 is an electric control switch mounted on a shaft 25 extending through the upper end of the cylinder and connected to a wind vane 26. The switch 24 may be of any suitable construction adapted to reverse the electric motor twice during the orbital cycle of the rotor and as shown it comprises two rings 27 and 28 with which the two rollers 29 and 30 contact. The rollers are carried by an arm 31 extending inwardly from the tower frame 15. Each ring has two segmental contacting portions separate from each other, the outer segments 27a and 27b and the inner segments 28a and 28b. 32 and 33 are slip rings carrying opposite potentials, these rings being connected to the contacting segments in such a manner that the two outer segments 27a and 27b carry opposite potentials, while the two inner segments 28a and 28b also carry opposite potentials. Thus, when the rollers 29 and 30 leave their respective segments 27a and 28a and contact with the segments 27b and 28b the potential on each of the rollers is reversed, thereby causing the reversal of the electric motor in the usual manner. The switch 24 is rotatably mounted so that its position is determined by the direction of the wind, while the rollers are fixedly mounted on the frame. Therefore, during one complete cycle of the frame in its orbital path the rollers make a complete rotation relative to the switch 24 and cause the motor to rotate in one direction for half of the cycle and in the other direction for the other half of the cycle. The arrangement is preferably such that the reversal takes place when the motor is in that portion of its orbital cycle where it is moving parallel to the direction of the wind.

With the parts as thus far described, the operation of the device is as follows:

Assuming that the wind is in the direction shown by the arrow 34 in Figure 3, then all of the cylinders above the line 35—35 which is transverse to the direction of the wind are rotating counter-clockwise, while those below said line are rotating clockwise. The forces resulting from the Magnus effect always tend to act at approximately right angles to the direction of the wind and these forces are represented by the arrows 36a and 36b, the former which point to the left designating the forces above the line 35—35 and the latter which point to the right designating the forces below the line. By referring to the drawings, it will be observed that all of these forces tend to produce a bodily movement of the rotors in a counter-clockwise direction as represented by the arrow 39. The maximum effective force on the rotors is obtained when the rotors pass the line 40—40, while the minimum effective force occurs when they pass the line 35—35. Reversal of the rotors therefore takes place in the vicinity of the line 35—35 where they are traveling substantially parallel to the direction of the wind.

With the device constructed as outlined above, the power available for use must be developed by the movement of the wheeled frames on the track 13. The velocity of the wind will of course affect the force acting upon each cylinder tending to move the same, and since the velocity of the wind is a variable factor, it is preferable to design the apparatus to operate most efficiently at some average velocity of the wind, such for example as 13 miles per hour. The cylinders are rotated preferably at a constant speed, which varies only upon the reversal thereof and this speed is so determined that the maximum force is obtained when the wind velocity is 13 miles per hour and when the velocity falls below this amount the effective force is diminished, although, if the velocity is increased the effective force is not proportionately increased.

In order to make available for practical purposes the power developed by my apparatus, it is preferable to convert the power into electrical energy and this is done by equipping each of the wheeled frames with electric generators 37 driven by the wheels 12. The generators 37 are preferably of the three-phase induction type and adapted to operate at substantially constant speed. The generators from each of the units are electrically connected into a common line in a suitable manner, as for example by employing trolleys 41a, 41b and 41c engaging the conducting rails 42a, 42b, and 42c. A certain amount of the power produced in this manner will be required to operate the electric motors on the rotors but the balance is available for other useful work.

The amount of power developed by my improved motor will of course depend upon the velocity of the wind. It is therefore preferable to connect the generators into a power line obtained from some other source for in this manner the increased velocity of the wind will create additional electrical power without substantially increasing the velocity of travel of the wheeled frames around the track. If the wind velocity drops below a predetermined value, it will also be preferable to provide an automatic electrical cut-out of conventional type to prevent the generators from functioning as motors and drawing current from the outside power line to propel the wheeled frames around the track.

It is to be understood that my invention is not limited to any certain electrical arrangement since any suitable means may be employed for converting the energy derived from the bodily movement of the rotors into available power. It is also to be understood that in its broader aspects the invention is not limited to the movement of the rotors around a circular track and it falls within the scope of my invention to compel the rotors to move bodily through any predetermined path having points laterally spaced with respect to the direction of the wind and to reverse the rotation of the rotors in order to reverse the direction of propulsion of the rotors between said points.

For example in Figure 9 I have shown an elliptical track 56 on which the cars are arranged in endless series in the same manner as heretofore described. In Figure 3 I have illustrated three concentric circular tracks on each of which is arranged an endless series of rotor-equipped cars. By this means it is possible to increase the number of power units operating on land of a given area. The distance between the adjacent tracks is so selected as to minimize the interference caused by the first row of rotors on the second or interior row. Also the distance between the adjacent cars is selected so as to prevent substantial interference between the rotors of successive cars on each track.

In the modification shown in Figure 8 the track instead of being arranged on the ground as in Figure 3 is depressed below the surface of the ground to such an extent that the car structure is all below the surface of the ground and only the rotor itself is exposed above the level of the ground. In this way the effectiveness of the wind on the rotor is maintained without permitting interference due to the resistance offered by the mass of the car structure.

What I claim as my invention is:

1. In a rotor power plant, a plurality of cylindrical rotors, a plurality of cars supporting said rotors and a rigid track for supporting said cars depressed below the gound level concealing substantially all of said cars and exposing only said rotors, and means for reversing the direction of rotation of each rotor while the car on which it is mounted is traveling substantially parallel to the direction of the wind.

2. In a rotor power plant, a track extending in an endless circuit, a plurality of carriers interconnected and movable as a unit on said track, a rotatable outer shell for each carrier, a vertically extending tower arranged within said shell, a cross-bracing truss structure secured to said shell and extending radially inward for a substantial distance, rotatable bearings on said tower arranged in a circle of substantially smaller diameter than the diameter of said shell and rotatably engaging said structure, means for rotating said shell, and means responsive to the changes in the direction of the wind for reversing the rotation of said shell when the same is moving bodily in a direction substantially parallel to the direction of the wind.

3. In a rotor power plant, a track extending in an endless circuit and depressed below the surface of the ground, a plurality of carriers interconnected and movable as a unit on said track and substantially concealed by the ground, a vertically extending tower on each carrier having a series of radially acting rollers thereon, each series of rollers being in a substantial horizontal plane, a cylindrical rotor surrounding each of said towers, inwardly projecting arms secured to said cylindrical rotor, a track supported by said radially extending arms a substantial distance from the periphery of said cylindrical rotor and cooperating with said rollers to permit said cylindrical rotor to rotate about a vertical axis relative to said tower, and means responsive to the changes in the direction of the wind for reversing the rotation of said cylindrical rotor when the same is moving bodily in a direction substantially parallel to the direction of the wind.

4. In a rotor power plant, a track extending in an endless circuit, a plurality of carriers interconnected and movable as a unit on said track, a rotatable outer shell for each carrier, a vertically extending tower arranged within said shell, a cross-bracing truss structure secured to said shell and extending radially inward for a substantial distance, rotatable bearings on said tower arranged in a circle of substantially smaller diameter than the diameter of said shell and rotatably engaging said structure and means for rotating said shell.

5. In a rotor power plant, a track extending in an endless circuit, a plurality of carriers interconnected and movable as a unit on said track, a rotatable outer shell for each carrier, a vertically extending tower arranged within said shell, a cross-bracing truss structure secured to said shell and extending radially inward for a substantial distance, rotatable bearings on said tower arranged in a circle of substantially smaller diameter than the diameter of said shell and rotatably engaging said structure, means for rotating said shell, and means for reversing the direction of rotation of said shell during the bodily movement of the same around said track.

6. In a rotor power plant, a track extending in an endless circuit, a plurality of carriers interconnected and movable as a unit on said track, a rotatable outer shell for each carrier, a vertically extending tower arranged within said shell, a cross-bracing truss structure secured to said shell and extending radially inward for a substantial distance, rotatable bearings on said tower arranged in a circle of substantially smaller diameter than the diameter of said shell and rotatably engaging said structure, means for rotating said shell, and means for automatically reversing the direction of rotation of each rotatable shell at predetermined points in said endless circuit.

JULIUS D. MADARAS.